United States Patent
Dober

(10) Patent No.: US 12,392,278 B2
(45) Date of Patent: Aug. 19, 2025

(54) METHOD OF OPERATING A WATER INJECTION SYSTEM

(71) Applicant: PHINIA DELPHI LUXEMBOURG SARL, Belvaux (LU)

(72) Inventor: Gavin Dober, Luxembourg (LU)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/720,292

(22) PCT Filed: Dec. 6, 2022

(86) PCT No.: PCT/EP2022/084669
§ 371 (c)(1),
(2) Date: Jun. 14, 2024

(87) PCT Pub. No.: WO2023/110552
PCT Pub. Date: Jun. 22, 2023

(65) Prior Publication Data
US 2025/0059907 A1    Feb. 20, 2025

(30) Foreign Application Priority Data

Dec. 16, 2021 (GB) ..................... 2118229

(51) Int. Cl.
*F02B 47/02* (2006.01)
(52) U.S. Cl.
CPC .................. *F02B 47/02* (2013.01)
(58) Field of Classification Search
CPC ....... F02D 41/14; F02D 19/12; F02D 41/0025
See application file for complete search history.

(56) References Cited

U.S. PATENT DOCUMENTS 3,490,422 A * 1/1970 Bullis ................ F02M 25/0225
123/25 R
2003/0192508 A1* 10/2003 Kishimoto ............. F02M 55/04
123/497

FOREIGN PATENT DOCUMENTS

DE    102016219752 A1 *  4/2018
DE    102017003628 A1    10/2018
(Continued)

OTHER PUBLICATIONS

International Search Report for PCT/EP2022/084669 dated Mar. 30, 2023, 4 pages.
(Continued)

*Primary Examiner* — Kevin A Lathers
(74) *Attorney, Agent, or Firm* — WARNER NORCROSS + JUDD LLP

(57) ABSTRACT

A method of operating a water injection system for a combustion engine, the system comprising an injector for injecting water at least indirectly into the combustion engine and a pump for pumping water from a tank through a feed line to the injector. In order to improve the dynamic performance of a water injection system for a combustion engine, the invention provides that the method comprises the steps of:
determining if there is a current demand for water injection;
if there is no current demand, checking at least one predefined standby condition to determine if, starting from a current pump performance, it is possible to meet a potential future demand for water injection; and
increasing the pump performance if at least one standby condition is fulfilled and
decreasing or deactivating the pump if no standby conditions are fulfilled.

13 Claims, 4 Drawing Sheets

(56) References Cited

FOREIGN PATENT DOCUMENTS

GB         2589364  A    6/2021
WO      2020059361  A1   3/2020

OTHER PUBLICATIONS

Machine assisted English translation of DE102016219752A1 obtained from https://worldwide.espacenet.com/patent on Jun. 11, 2024, 11 pages.
Machine assisted English translation of DE102017003628A1 obtained from https://worldwide.espacenet.com/patent on Jun. 11, 2024, 21 pages.
Machine assisted English translation of WO2020059361A1 obtained from https://worldwide.espacenet.com/patent on Jun. 11, 2024, 19 pages.

* cited by examiner

METHOD OF OPERATING A WATER INJECTION SYSTEM

CROSS-REFERENCE TO RELATED APPLICATIONS

This application is the U.S. National Stage of International Application No. PCT/EP2022/084669 filed on 6 Dec. 2022, which claims priority to and all advantages of United Kingdom Application No. 2118229.0 filed on 16 Dec. 2021, the contents of which are incorporated herein by reference.

TECHNICAL FIELD

The invention relates to a method of operating a water injection system for a combustion engine, and to a water injection system for a combustion engine.

BACKGROUND ART

Despite the increasing importance of battery-operated electric vehicles, vehicles with combustion engines can be expected to remain a widely used drive technology for the next decades. However, there is an increasing demand to reduce pollutants produced by these engines, corresponding to various national and international regulations. One important key for such reduction is an improvement of engine thermal efficiency. A particular challenge arises for high-performance conditions, in which the engine speed and/or the engine load are extremely high and where the exhaust temperature can limit the maximum engine output. These conditions, which rarely occur for normal passenger cars but are common, e.g., for sports cars, are traditionally handled by fuel enrichment. I.e., the amount of fuel injected is higher than the amount that can be burned with the available oxygen. The unburnt fuel leads to a cooling effect which lowers the exhaust temperature and enables higher engine output. However, with this strategy, the exhaust gases contain considerable amounts of unburnt fuel. With the above-mentioned regulations, this approach will no longer be possible. Therefore, different methods will be required to enable improvements in engine specific power and vehicle drivability. One such alternative is water injection, where water is injected, normally indirectly, into the combustion engine. A common approach is to inject water in atomized form into an intake port of the engine. This approach has been shown to reduce combustion temperatures and to improve engine knock resistance. Several engine improvements are possible with this strategy, including compression ratio increase, specific power output increase and engine/exhaust system protection.

Since water injection is only necessary and beneficial for high engine power output, while it would be detrimental under low power output conditions, there is a highly dynamic water injection demand depending on the current engine performance. When required, water must be delivered instantly and at a well-controlled pressure to ensure a good spray quality and dosing control. When the engine load is low or moderate, there is no need for water injection. However, if the engine load suddenly increases, a high flow rate can be required. Although the reaction times of the water delivery system can be relatively short, providing the required water mass at an optimum pressure in response to a suddenly increasing injection demand is a challenge.

Technical Problem

It is thus an object of the present invention to improve the dynamic performance of a water injection system for a combustion engine.

This problem is solved by a method according to claim 1 and by a water injection system according to claim 13.

General Description of the Invention

The invention provides a method of operating a water injection system for an internal combustion engine, the system comprising an injector for injecting water at least indirectly into the internal combustion engine and a pump for pumping water from a tank through a feed line to the injector. The combustion engine can in particular be an engine of an automotive vehicle, e.g. a car, in particular a high-performance car like a sports car, but could be any other kind of combustion engine. It may be a spark ignition engine or diesel engine but could also be a less common type of combustion engine. In many applications, it is a turbocharged engine, but this is not essential for the invention. The invention has been particularly developed for engine with direct gasoline injection (GDi). The injector is arranged and adapted to selectively inject water at least indirectly into the engine. In particular, it may be arranged to inject the water into an inlet port or inlet manifold upstream of a combustion chamber of the engine, from where the water can enter the combustion chamber together with an air stream that runs through the inlet port into the chamber. In such a case, the water is indirectly injected into the engine. However, it could also be injected directly into the combustion chamber, in which case the injector is arranged in a wall portion of the combustion chamber. The injector comprises a valve, normally a solenoid valve, which can be opened to enable water injection. For maximum efficiency, the water is normally atomized by the injector, i.e. a spray of droplets is formed, which in turn necessitates a certain amount of pressure inside or upstream of the injector. Commonly used injection pressures are between 5 and 10 bar. It will be understood that there may be an individual injector for each cylinder of the engine.

The injector is connected to a tank (or reservoir) by a feed line, which could be a rigid pipe, a flexible hose, a combination of these or any vessel that is adapted for providing a watertight connection between the tank and the injector. A pump, which is normally electrically operated, is adapted to transfer water from the tank through the feed line to the injector. Apart from transferring, i.e. pumping, the water to the injector, one function of the pump also is to create an adequate pressure upstream of the injector.

It will be understood that the water delivery system can comprise additional components like various sensors, a filter for preventing contaminants in the water from entering the injector, or a heater to prevent water from freezing inside the tank, the delivery line or the pump. In particular, it may comprise a control unit that is adapted to control the steps of the inventive method as mentioned below, such control unit may be a separate unit or integrated in the Engine control unit. In many applications, the combustion engine is connected to a transmission with several gears, which in turn is connected to the drive wheels of the car.

According to one step of the inventive method, it is determined if there is a current demand for water injection. Water injection will normally only be necessary or useful when the engine power output is high. Under these circumstances, water injection can effectively reduce the combustion temperature and/or the exhaust temperature, thereby protecting the engine and possibly other elements from overheating. Consequently, it is possible to determine from the engine power output whether there is a current demand for water injection. Under these circumstances, the injector will be opened selectively, either permanently or intermittently, and the pump will be activated, while a pump performance (e.g. a pump speed) is adapted to maintain an adequate (and/or optimum) pressure upstream of the injector. This can be performed by measuring this pressure and adapting the pump performance so that the pressure is maintained within a nominal range. This can also be referred to as "standard pump control".

In another step, if there is no current demand for water injection, at least one predefined standby condition is checked to determine if, starting from a current pump performance, it is possible to meet a potential future demand for water injection. It should be noted that a future demand cannot be foreseen with certainty. It can only be estimated. With this estimation, which could be based on a worst-case scenario, it is possible to determine if it would be possible to meet this demand, given the current pump performance. "Pump performance" refers to at least one operation parameter of the pump, normally a pump speed. This check takes into account that the pump, the feed line and the injector have a non-zero reaction time, i.e., if an injection demand arises, it is impossible to respond without a delay, e.g., because it takes time to set the pump into motion, to initiate or increase water flow through the feed line, to build up pressure in the feed line etc. In some cases, this delay would not allow to meet the water injection demand. In order to detect such a deficiency, at least one standby condition is checked. The term "standby condition" means that such a condition indicates that the injection system should be set on a "standby" or "state of readiness" so that it is possible to meet the future demand.

Accordingly, in another step, the pump performance is increased if at least one standby condition is fulfilled, i.e., if a deficiency is detected. This means that at least one standby condition has to be fulfilled, but it includes the option that in certain embodiments of the invention, a plurality of standby conditions have to be fulfilled in order to increase the pump performance. As indicated above, increasing the pump performance normally refers to increasing the pump speed. Increasing the pump performance sets the system into the above-mentioned "state of readiness" or "standby". Accordingly, the system should be ready to meet a future injection demand. "Increasing the pump performance" includes the possibility that the pump performance is zero before the increase, i.e., the pump is in a non-active state. In other words, increasing the pump performance may also include activating the pump.

If no standby condition is fulfilled, or not enough standby conditions are fulfilled, pump performance is not increased. Depending on the embodiment, the pump performance could be left unchanged, it could be decreased and/or the pump could be turned off.

The idea of the invention is to analyze if the pump (or the delivery system as a whole) is ready to meet a future injection demand if such injection demand occurs. Accordingly, the system can be set on standby if necessary, so that it is ready for a potentially imminent injection demand, which allows optimum performance of the combustion engine especially at high power output. On the other hand, the system can remain in a state of low (or zero) power consumption if no standby condition (or not enough standby conditions) is (are) fulfilled. This helps to save energy, reduce noise and reduce wear on the components of the system.

Preferably, at least one standby condition depends on a comparison of at least two time intervals. As a rule, at least one of these time intervals is characteristic of the delivery system (or the pump as such) and at least one time interval is characteristic of the engine, mostly of how fast the operation parameters of the engine can change, thereby necessitating a water injection. "At least two time intervals" includes the possibility that e.g. one time interval is compared with a sum or a difference of two or more time intervals. The comparison can refer to determining which time interval is greater (i.e., longer). However, it could also refer to determining if interval A is at least a certain amount of time greater than interval B. It should be noted that the standby condition, i.e., the comparison performed for increasing pump performance, could be different from a comparison performed for the decreasing pump performance. For instance, a hysteresis could be introduced so that pump performance is increased if interval A is at least 10 ms greater than interval B, but pump performance is only decreased if interval A is at least 10 ms smaller than interval B.

In the following, several standby conditions are discussed. Any set of conditions can be checked and used as alternative conditions or as conditions that have to be fulfilled simultaneously (or cumulatively).

According to one preferred embodiment, one standby condition depends on a comparison of a first-injection time interval, corresponding to a remaining time until a first water injection is potentially needed, and a minimum-pressure time interval, corresponding to a remaining time until a minimum pressure necessary for injection can be achieved. The standby condition is based on a comparison of a first-injection time interval with a minimum-pressure time interval. The first-injection time interval is the time that remains until a first injection is potentially needed. This is to be understood as an estimation. One possibility is to use the shortest realistic amount of time it could take until the first injection of water is needed ("worst-case scenario"). As will be explained later, this time interval may be determined (or estimated) based on one or several parameters. The minimum-pressure time interval, on the other hand, is the time it takes for the pump to generate a minimum pressure that is necessary for water injection. It will be understood that this also can depend on at least one parameter. One possibility for this standby condition would be to check if the first-injection time interval is smaller than the minimum-pressure time interval. This corresponds to a situation in which the pump is not ready to build up the necessary pressure before the first injection is needed. In this case, the pump performance should be increased.

Further, the method may comprise, if no standby condition is fulfilled, decreasing the pump performance. If the no standby condition is fulfilled (i.e., in case of several standby conditions, none of them is fulfilled), this is taken as an indication that the pump will not be needed in the near future. Therefore, the pump performance can be decreased, thereby saving energy. This also includes the possibility that the pump is deactivated.

In one embodiment, the system comprises a non-return valve interposed between the pump and the injector, and one standby condition depends on a comparison of a current feed pressure, upstream of the injector, with a minimum feed pressure needed for injection. If the system comprises a non-return valve in the feed line between the pump and the injector, a non-zero feed pressure can be maintained upstream of the injector even if the pump has been turned off. When the injector is opened, the feed pressure decreases, but not instantly to zero, which gives the system some extra time to re-establish pressure generation by the pump. One standby condition is based on a comparison of the current feed pressure, i.e. the pressure in the feed line upstream of the injector (and downstream of the non-return valve), and a minimum feed pressure. The latter is a pressure that is necessary to ensure that water can be injected properly, in particular so that proper atomization and mass flow rate are achieved. Usually, the current feed pressure is compared to the minimum feed pressure, and if it is smaller, the standby condition is fulfilled. This indicates that even a minimal activation of the injector is not possible.

One standby condition can depend on a comparison of a maximum-injection time interval, corresponding to a remaining time until a maximum injection rate is potentially needed, and the sum of the minimum-pressure time interval and a maximum-flow time interval, corresponding to a remaining time until maximum flow can be supplied to the injector starting from zero flow. The maximum-injection time interval is characteristic of the engine and the vehicle, with the maximum injection rate normally being required when the engine has reached its maximum power output. The minimum-pressure time interval is characteristic of the delivery system (or the pump as such), as is the maximum-flow time interval. The latter characterizes how long it takes from the beginning of the injection (zero flow) to reach the maximum flow. For instance, it can be checked if the maximum-injection time interval is smaller than the sum of the minimum-pressure time interval and the maximum-flow time interval. If this is the case, the delivery system would not be able to meet a potential demand for maximum injection, and pump performance should be increased.

As mentioned above, the engine is normally connected to a transmission with several gears. Thus, one standby condition may depend on a comparison of a first-injection-gear-shift time interval, corresponding to a remaining time until a first injection is potentially needed in case of a gear shift, and the minimum-pressure time interval. The first-injection-gear-shift time interval is characteristic of the engine, the vehicle and the transmission. It will be understood that changing the gear changes the engine speed and the engine load in a comparatively short time and influences the engine power output, which in turn could necessitate a water injection. The time interval remaining until the first injection in case of a gear shift is different from the one without a gear shift. Accordingly, it is advisable to check this condition independently of the comparison between the first-injection time interval and the minimum-pressure time interval.

Furthermore, one standby condition can depend on a comparison of a maximum-injection-gear-shift time interval, corresponding to a remaining time until a maximum injection rate is potentially needed in case of a gear shift, and the sum of the minimum-pressure time interval and the maximum-flow time interval. This comparison is similar to the abovementioned one between the maximum-injection time interval and the sum of the minimum-pressure time interval and the maximum-flow time interval but takes into account that the time to reach maximum injection rate is different if a gear shift occurs.

As already indicated, the pump performance can be changed depending on at least one standby condition. Normally, the pump speed is changed depending on at least one standby condition. For instance, if the standby condition, or at least one of several standby conditions, is fulfilled, the pump speed is increased. For example, the pump speed may be increased if any of the abovementioned standby conditions is fulfilled individually. If the pump is inactive, increasing the pump speed may also refer to activating the pump. If no standby condition is fulfilled, the pump speed may be left unchanged, or it may be decreased. The latter is beneficial in that it helps to save energy.

As one option, the pump speed may be decreased by deactivating the pump if the pump speed is below a predefined minimum speed. For instance, if no standby condition is fulfilled, the pump speed can be decreased but the pump will still be running. If, however, the speed is already below the minimum speed, the pump is deactivated.

As a very simple, and probably inadequate approximation, at least one of the abovementioned time intervals could be assumed to be constant. However, it is more realistic that at least one time interval is determined as a function of at least one parameter, or a plurality of parameters. These parameters, which may be measured directly by adequate sensors or may be derived indirectly from sensor values, determine the value of the respective time interval. However, some parameters that could be relevant, but are considered less important, can be neglected. For instance, an inclination of the road can be assumed to be constant, e.g., a level road is assumed. Also, vehicle mass can be assumed to be constant, e.g., minimal vehicle mass is assumed at all times. Gear-shift time can be regarded as a constant, e.g., the minimum possible gear-shift time.

Preferably, at least one time interval is determined as a function of an engine speed and an engine load. The parameter pair of engine speed (measured e.g. in rotations per minute) and engine load (measured e.g. as a torque in newton-meter or as a pressure, normally as an indicated mean effective pressure (IMEP), in Kilopascal) define a so-called operating point of the engine. Each possible operating point corresponds to a point in a 2D-diagram. It may be understood that the first injection as well as the maximum injection rate correspond to a certain areas (or lines) in the diagram. Since the operating parameters (speed and load) cannot change instantly, it generally takes longer for the engine to transition to one such area from an operating point that is further away in the diagram than from an operating point that is closer to the area. However, the (minimal) transition time between any two operating points does not simply depend on the distance between these two operating points, but depends on the physical characteristics of the engine and the vehicle. However, it is possible to find a relationship between the operating point and the abovementioned time intervals for a given vehicle, which can then be used to determine the time interval as a function of the operating parameters engine speed and engine load. The relationship can be found by measurement or by calculation.

It is preferred that at least one of the first-injection time interval, the maximum-injection time interval and the maximum-flow time interval is determined as a function of a gear number. The gear number, i.e., the gear in which a transmission is currently operating (first gear, second gear etc.), generally influences both of these time intervals. This is mostly due to the fact that the operating parameters of the engine, in particular the engine speed, normally change slower the higher the gear, because as the engine speed increases, the vehicle speed also increases, and in higher gears, more energy is required to accelerate the vehicle for the same engine speed increase. In other words, the maximum possible increase rate of the engine speed is lower the higher the gear number is. Consequently, it takes longer to reach an operating point that requires the first injection, the maximum injection or the maximum flow, respectively. While the first-injection time interval and the maximum-injection time interval are further determined as a function of the current engine speed and the engine load, the maximum-flow time interval can be considered as a function of engine speed and gear number only, because the engine load can be assumed to be at its maximum level (and thus constant) in a maximum acceleration condition.

Preferably, the minimum-pressure time interval is determined as a function of a pump speed and the current feed pressure. It will be understood that the time it takes to reach the minimum pressure necessary for injection generally depends on both these parameters. As a rule, it will be shorter the higher the current pump speed is since this allows the pump to build up feed pressure faster. Also, it will be shorter the higher the current feed pressure is, because this corresponds to a smaller difference between the minimum pressure and the current pressure. Of course, these statements are not to be construed in any limiting way. It will be understood that the exact dependency of the minimum-pressure time interval from each of these parameters can be non-linear.

It is possible to calculate any of the above-mentioned time intervals according to a formula that may be a more or less accurate representation of the actual relation between the time interval and its parameters (e.g. engine speed, engine load etc.). However, it is also possible to determine such a relation by experiment, i.e., by measuring the time interval for each set of parameters. In order to reduce the calculation effort, it is preferred that at least one time interval is determined from a lookup table. In such a lookup table, time values, which have been determined by experiment or based on a formula, can be stored in permanent (read-only) or non-permanent form. The lookup table of course will not contain time values for every possible set of parameters but only for a reasonable number of possible combinations. If the current parameters differ significantly from stored parameters, interpolation methods can be applied to calculate an approximate time interval. Alternatively, the closest parameter set in the lookup table can be used as an approximation.

The invention also provides a water injection system for a combustion engine, comprising an injector for injecting water at least indirectly into the combustion engine, a pump for pumping water from a tank through a feed line to the injector, and a control unit configured to:
- determine if there is a current demand for water injection;
- if there is no current demand, check at least one predefined standby condition to determine if, starting from a current pump performance, it is possible to meet a potential future demand for water injection; and
- increase the pump performance if at least one standby condition is fulfilled.

All of these terms have already been explained above with respect to the inventive method and therefore will not be explained again. Preferred embodiments of the inventive water injection system correspond to those of the inventive method.

BRIEF DESCRIPTION OF THE DRAWINGS

Preferred embodiments of the invention will now be described, by way of example, with reference to the accompanying drawings, in which.

DESCRIPTION OF PREFERRED EMBODIMENTS

Figure 1:
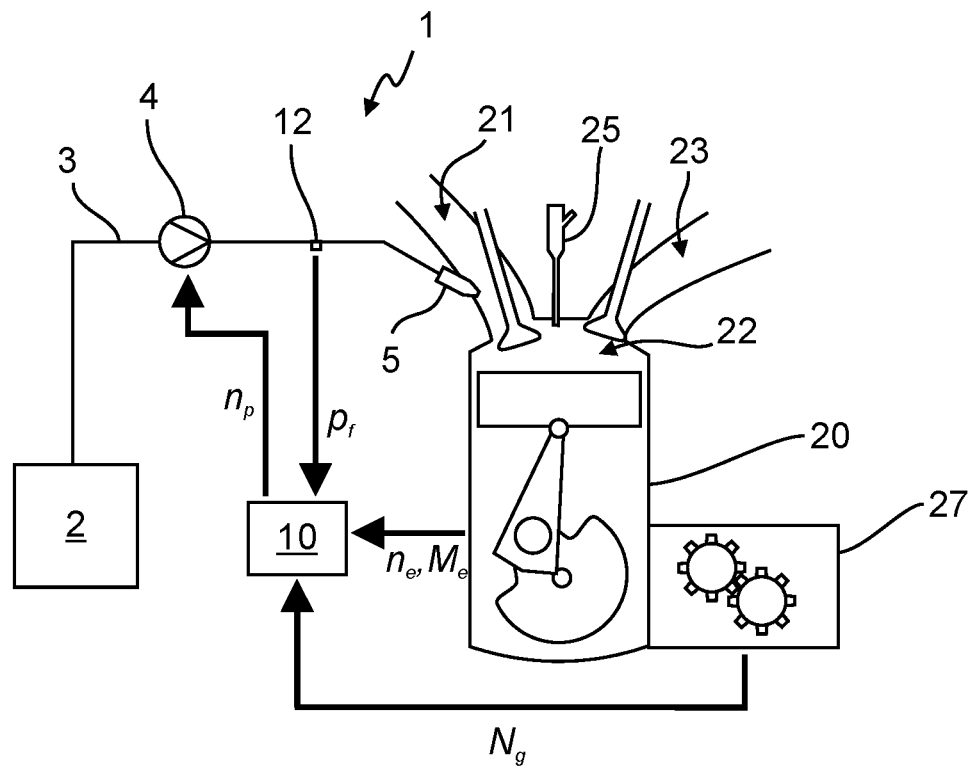
FIG. 1 is a schematic view of a combustion engine and a first embodiment of an inventive water delivery system.

FIG. 1 shows a schematic view of an internal combustion engine 20 of a car, e.g., a sports car, a transmission 27 connected thereto and a first embodiment of an inventive water delivery system 1. The engine may in particular be of the gasoline direct injection type—GDi. It will be understood that the engine 20 normally has a plurality of cylinders, of which only one is shown in this drawing. A combustion chamber 22 is connected to an intake port 21 and an exhaust port 23, each of which can be temporarily isolated from the combustion chamber 22 by an intake valve or exhaust valve, respectively. During the combustion cycle, air is taken in through the intake port 21 into the combustion chamber 22 and fuel, e.g., gasoline, is directly injected through a fuel injector 25. Afterwards, the combustion is initiated and the exhaust gases are expelled through the exhaust port 23. The torque generated by the engine 20 is transmitted to the drive wheels (not shown) via a transmission 27 comprising several gears (e.g. five forward gears and one reverse gear).

In order to ensure optimum performance of the engine 20 even at extremely high power output, the water delivery system 1 is provided so that under certain circumstances, water can be injected into the inlet port 21 via a water injector 5, which, for sake of brevity, is hereinafter simply referred to as "the injector". The injector 5 is connected to a tank 2 via a feed line 3. Water that is stored in the tank 2 can be transferred to the injector 5 by the action of an electrically operated pump 4, which is shown here at an intermediate position in the feed line 3, but could also be positioned closer to or within the tank 2. Between the pump 4 and the injector 5, a pressure sensor 12 is located within or on the feed line 3. The system 1 also comprises a control unit 10 that controls the pump 4. It can activate or deactivate the pump 4 and it can also control a pump speed $n_p$ (measured in rotations per minute) of the pump 4. Also, the control unit 10 receives several parameters. It receives a feed pressure $p_f$ from the pressure sensor 12, an engine speed $n_e$ (measured in rotations per minute), an engine load $M_e$ (measured in newton-meter) and a gear number $N_g$ that indicates in which gear the transmission 27 is operating. In this schematic representation of FIG. 1, the control unit 10 is shown to receive the engine speed $n_e$, the engine load $M_e$ and the gear number $N_g$ from the engine 20 and the transmission 27, respectively, which, however, is only to be understood in schematic way. In reality, the control unit 10 could receive these parameters from dedicated sensors and/or from a control system for the engine 20 and/or the transmission 27.

While no water injection is required if power output of the engine 20 is low or moderate, corresponding to low or moderate engine speed $n_e$ and engine load $M_e$, there is a demand for water injection at high power output, where water is injected and atomized by the injector 5 and helps to lower the combustion temperature in the combustion chamber 22, thereby preventing engine components from overheating and also increasing knocking resistance. Whether there is a current demand for water injection can be determined by the engine speed $n_e$ and engine load $M_e$, which can also be regarded as 2D-coordinates of an operating point. Depending on the operating point, a certain injection rate and feed pressure $p_f$ can be provided for optimum engine operation. At this time, the control unit 10 receives the engine speed $n_e$ and engine load $M_e$ and controls the pump 4 and the injector 5 accordingly.

Figure 2:
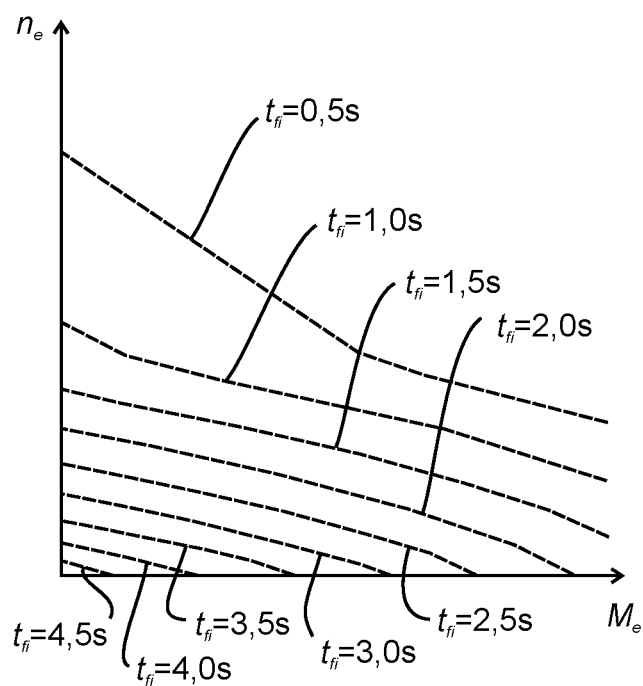
FIG. 2 is a diagram illustrating a first-injection time interval.

However, if there is no current injection demand, a transition to an operating point that requires water injection could potentially occur so fast that the water delivery system 1 cannot react adequately. FIG. 2 shows a 2D-diagram for the operating point of the engine 20 with several lines. Each line represents a first-injection time interval $t_{fi}$, which represents a remaining time until a first water injection could potentially be needed. The uppermost line represents those operating points for which the first-injection time interval is 0.5 s, the line below represents the operating points for which the first-injection time interval is 1.0 s etc. The diagram of FIG. 2 can be the result of measurements from a number of test runs performed on the engine 20, or it could be the result of calculations. It should be noted that the diagram of FIG. 2 is only valid for a gear number $N_g=3$, i.e., if the transmission 27 is operated in third gear. The diagram would be different for a different gear number $N_g$. In summary, the first-injection time interval $t_{fi}$ is regarded as a function of the engine speed $n_e$, the engine load $M_e$ and the gear number $N_g$.

Similarly, a maximum-injection time interval $t_{mi}$ can be determined as a function of the engine speed $n_e$, the engine load $M_e$ and the gear number $N_g$. This is the remaining time until a maximum injection rate is potentially needed. Also, a first-injection-gear-shift time interval $t_{fi,gs}$, which represents the time remaining until a first injection is potentially needed in case of a gearshift, can be determined as a function of the engine speed $n_e$ and the engine load $M_e$. Furthermore, a maximum-injection-gear-shift time interval $t_{mi,gs}$, which represents a remaining time until a maximum injection rate in case of a gearshift, is determined as a function of the engine speed $n_e$ and the engine load $M_e$. Another time interval that is determined is a maximum-flow time interval $t_{mf}$, which is a function of the engine speed $n_e$ and the gear number $N_g$ and represents the potentially remaining time from a flow rate of zero to a maximum water flow rate. It will be understood that any of these time intervals is an estimation or projection for future processes. One possible choice would be to set the lowest realistic value for each of these time intervals, e.g., the shortest realistically possible time remaining until the first injection etc.

Apart from these time intervals, which characterize the engine 20 and the transmission 27, another time interval is determined that is characteristic of the delivery system 1 or the pump 4 as such. This is a minimum-pressure time interval $t_{mp}$ and represents the time until a minimum pressure needed for injection can be established in the feed line 3. It is a function of the current feed pressure $p_f$ and the current pump speed $n_p$.

Figure 3:
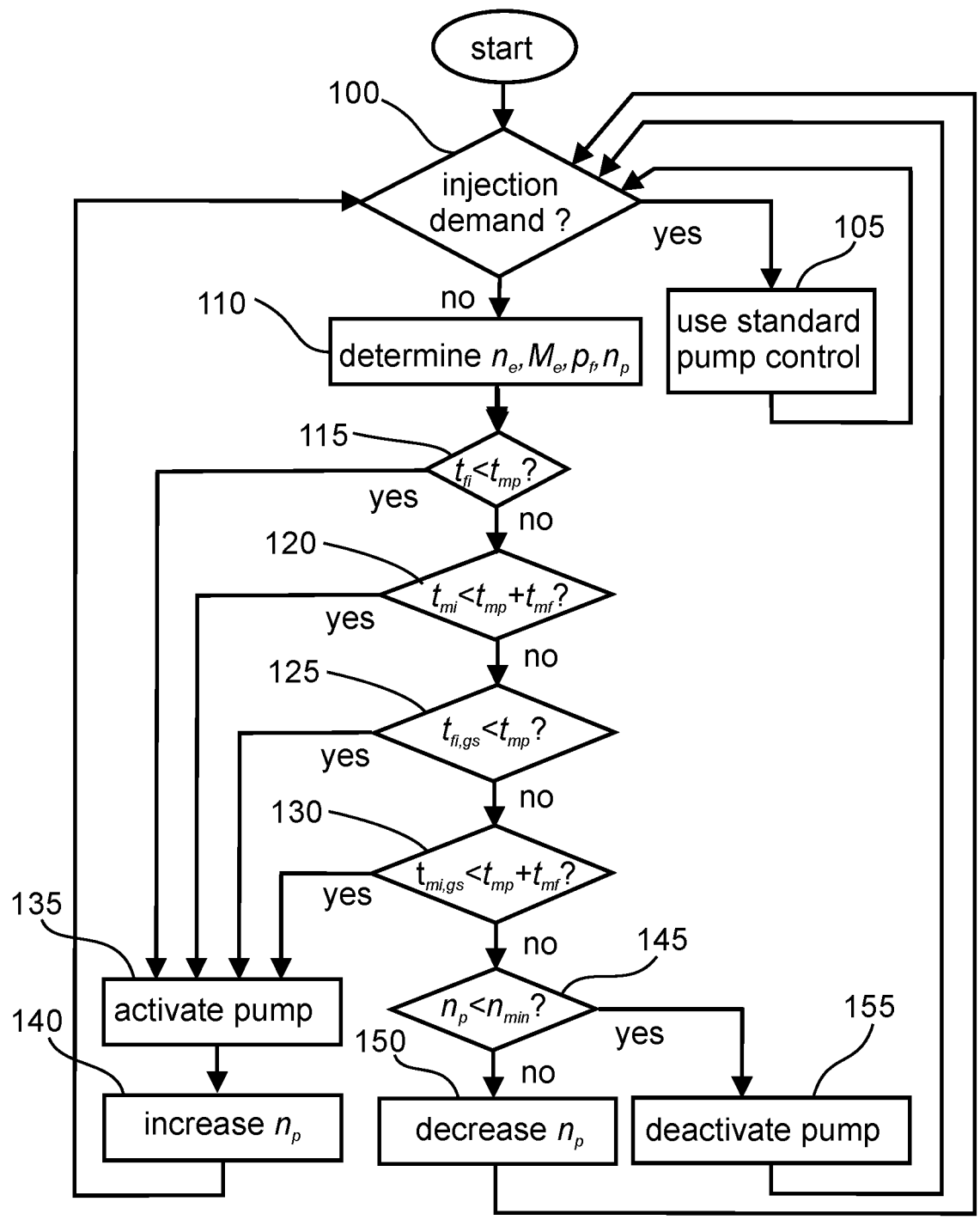
FIG. 3 is a flowchart of a first embodiment of an inventive method.

Using the above-mentioned time intervals, the water delivery system 1 can be operated so that it can respond quickly and adequately to a suddenly occurring injection demand. The corresponding method will now be discussed with reference to FIG. 3. The values for the time intervals can be stored in a lookup table that is integrated into the control unit 10 or is accessible by the control unit 10. The time intervals could also be represented by an equation.

After the start of the method, it is checked at 100 if there is a current injection demand, i.e., if the operating point is in a region that currently requires water injection. If so, the method continues at 105 and uses a standard pump control, which means that the control unit 10 controls the pump 4 and the injector 5 to establish an adequate injection rate into the intake port 21. If there is no current injection demand, the method continues at 110, where the engine speed $n_e$, the engine load $M_e$, the feed pressure $p_f$, and the current pump speed $n_p$ are determined. It should be noted that the engine speed $n_e$, the engine load $M_e$ and the feed pressure $p_f$ could also have been determined at or before step 100 and thus would not need to be determined again. In the following steps 115 to 130, four standby conditions are checked. Although these conditions are checked here in a certain sequence, the sequence could be modified or at least two of these standby conditions could be checked simultaneously.

At 115, a standby condition is checked by comparing the first-injection time interval $t_{fi}$ with the minimum-pressure time interval $t_{mp}$. In other words, the first standby condition is:

$$t_{fi}(n_e, M_e, N_g) < t_{mp}(p_f, n_p).$$

At 120, the maximum-injection time interval $t_{mi}$ is compared to the sum of the minimum-pressure time interval and the maximum-flow time interval, in other words, this standby condition is:

$$t_{mi}(n_e, M_e, N_g) < t_{mp}(p_f, n_p) + t_{mf}(n_e, N_g).$$

At 125, the first-injection-gear-shift time interval $t_{fi,gs}$ is compared to the minimum-pressure time interval $t_{mp}$, i.e., this standby condition is:

$$t_{fi,gs}(n_e, M_e) < t_{mp}(p_f, n_p).$$

At 130, the maximum-injection-gear-shift time interval $t_{mi,gs}$ is compared to the sum of the minimum-pressure time interval $t_{mp}$ and the maximum-flow time interval $t_{mf}$, in other words, this standby condition is:

$$t_{mi,gs}(n_e, M_e) < t_{mp}(p_f, n_p) + t_{mf}(n_e, N_g).$$

If any of these standby conditions is fulfilled, the method continues at 135 by activating the pump (or keeping it activated, respectively), increasing the pump speed $n_p$ at 140 and then returning to step 100. If none of the standby conditions is fulfilled, it is checked at 145 if the pump speed $n_p$ is below a predefined minimum pump speed $n_{min}$. If not, the pump speed $n_p$ is decreased at 150 before the method returns to step 100. If so, the pump 4 is deactivated (or kept in a deactivated state, respectively) at 155 and the method returns to step 100.

Figure 4:
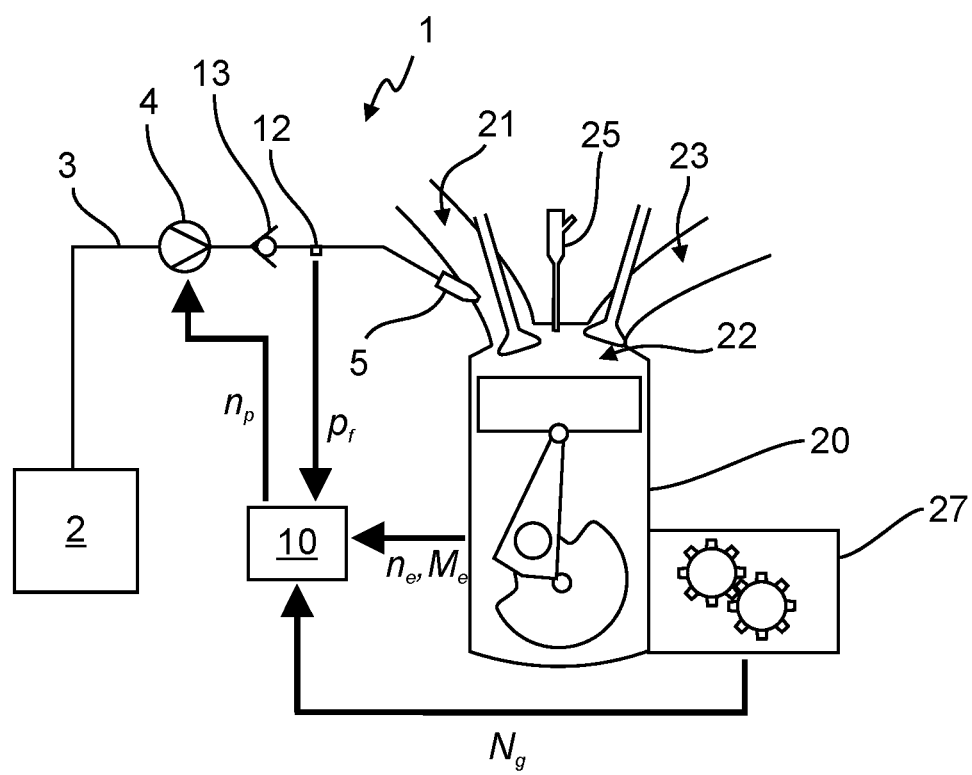
FIG. 4 is a schematic view of a combustion engine and a second embodiment of an inventive water delivery system.

FIG. 4 shows an engine 20 and a transmission 27, which are identical to FIG. 1, with a second embodiment of an inventive water delivery system 1. This is largely identical to the first embodiment and insofar will not be discussed again. However, a non-return valve 13 is inserted in the feed line 3 upstream of the injector 5 and the pressure sensor 12, but downstream of the pump 4. If the pump 4 is deactivated, a previously established feed pressure $p_f$ upstream of the injector 5 can be maintained as long as no water is injected into the intake duct 21. To some extent, the portion of the feed pipe 3 between the non-return valve 13 and the injector 5 can be regarded as a pressure reservoir that allows to supply an adequate pressure for injection for a brief time period without action of the pump 4.

Figure 5:
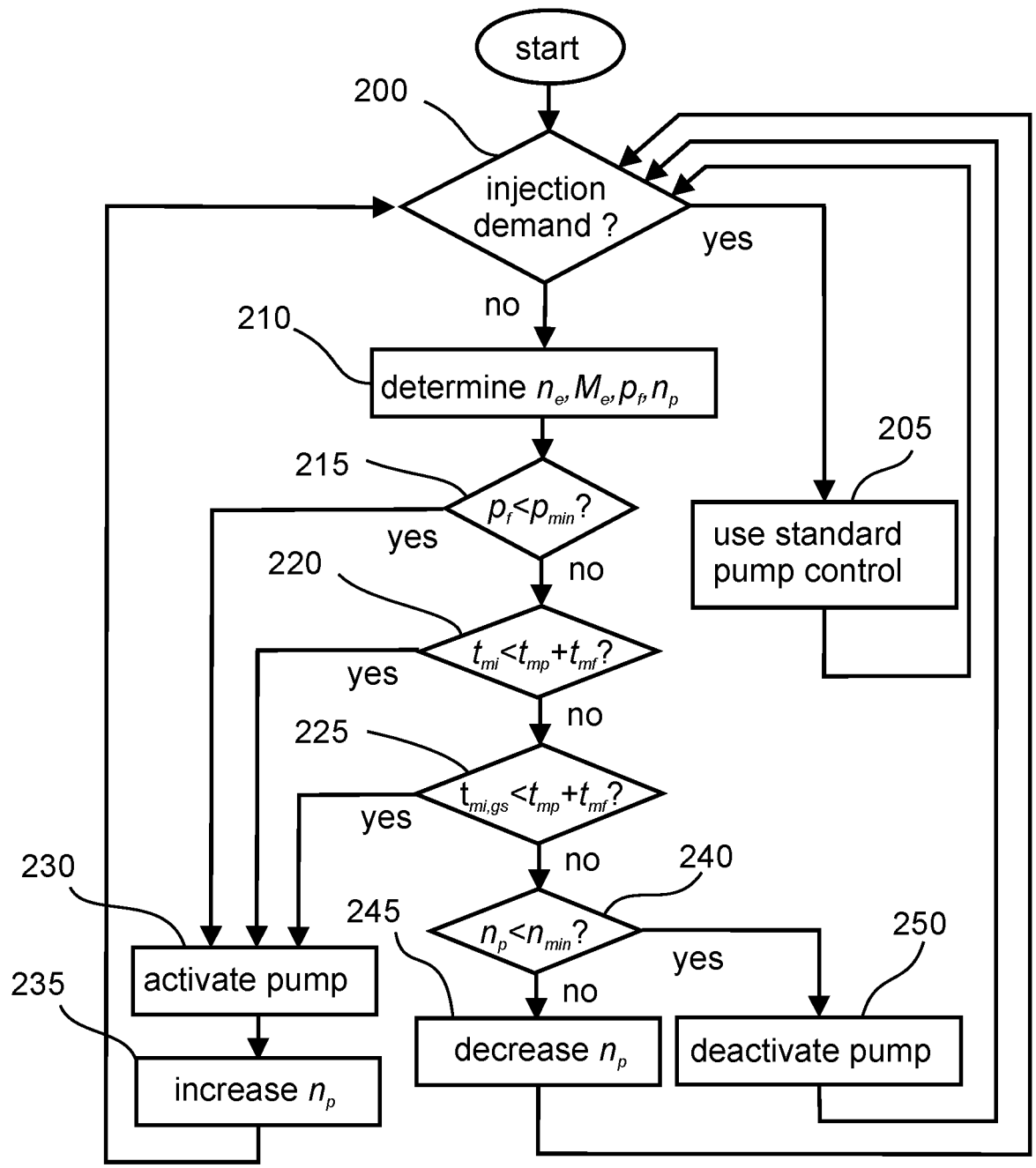
FIG. 5 is a flowchart of a second embodiment of an inventive method.

FIG. 5 is a flowchart illustrating a second embodiment of an inventive method that can be realized with the water delivery system 1 of FIG. 4. After the start of the method, it is checked at 200 if there is a current injection demand. If so, the method continues at 205 and uses a standard pump control. If there is no current injection demand, the method continues at 210, where the engine speed $n_e$, the engine load $M_e$, the feed pressure $p_f$, and the current pump speed $n_p$ are determined. Then, at 215 to 225, several standby conditions are checked.

At 215, the current feed pressure $p_f$ is compared with a minimum pressure $p_{min}$ necessary for adequate injection into the intake duct 21, i.e., this standby condition is:

$$p_f < p_{min}.$$

At 220, the maximum-injection time interval $t_{mi}$ is compared to the sum of the minimum-pressure time interval $t_{mp}$ and the maximum-flow time interval $t_{mf}$, in other words, this standby condition is:

$$t_{mi}(n_e, M_e, N_g) < t_{mp}(p_f, n_p) + t_{mf}(n_e, N_g).$$

At 225, the maximum-injection-gear-shift time interval $t_{mi,gs}$ is compared to the sum of the minimum-pressure time interval $t_{mp}$ and the maximum-flow time interval $t_{mf}$, in other words, this standby condition is:

$$t_{mi,gs}(n_e, M_e) < t_{mp}(p_f, n_p) + t_{mf}(n_e, N_g).$$

If any of these standby conditions is fulfilled, the method continues at 230 by activating the pump 4 (or maintaining it activated), increasing the pump speed $n_p$ at 235 and then returning to step 200. If none of the standby conditions is fulfilled, it is checked at 240 if the pump speed $n_p$ is below a predefined minimum pump speed $n_{min}$. If not, the pump speed $n_p$ is decreased at 245 before the method returns to step 200. If so, the pump 4 is deactivated at 250 and the method returns to step 200.

LEGEND OF REFERENCE NUMBERS

1 water delivery system
2 tank
3 feed line
4 pump
5 water injector
10 control unit
12 pressure sensor
13 non-return valve
20 engine
22 combustion chamber
23 exhaust port
25 fuel injector
27 transmission

The invention claimed is:

1. A method of operating a water injection system of an internal combustion engine, the system comprising an injector for injecting water at least indirectly into the combustion engine and a pump for pumping water from a tank through a feed line to the injector, the method comprising the steps of:
   determining if there is a current demand for water injection;
   if there is no current demand, checking at least one predefined standby condition to determine if, starting from a current pump performance, it is possible to meet a potential future demand for water injection; and
   increasing the pump performance if at least one of the at least one standby condition is fulfilled,
   wherein at least one of the at least one standby condition depends on a comparison of at least two time intervals, and wherein one said standby condition depends on a comparison of a first-injection time interval ($t_{fi}$), which is one of said time intervals and corresponds to a remaining time until a first water injection is potentially needed, and a minimum-pressure time interval ($t_{mp}$), which is one of said time intervals and corresponds to a remaining time until a minimum pressure needed for injection can be achieved.

2. The method according to claim 1, comprising, if no standby condition is fulfilled, decreasing the pump performance.

3. The method according to claim 1, wherein the system comprises a non-return valve interposed between the pump and the injector, and one standby condition depends on a comparison of a current feed pressure ($p_f$), upstream of the injector, with a minimum feed pressure ($p_{min}$) needed for injection.

4. The method according to claim 1, wherein one said standby condition depends on a comparison of a maximum-injection time interval ($t_{mi}$), which is one of said time intervals and corresponds to a remaining time until a maximum injection rate is potentially needed, and the sum of the minimum-pressure time interval ($t_{mp}$), and a maximum-flow time interval ($t_{mf}$), which is one of said time intervals and corresponds to a remaining time until maximum flow can be supplied to the injector starting from zero flow.

5. The method according to claim 1, wherein the engine is connected to a transmission with several gears and one said standby condition depends on a comparison of a first-injection-gear-shift time interval ($t_{fi,gs}$), which is one of said time intervals and corresponds to a remaining time until a first injection is potentially needed in case of a gear shift, and a minimum-pressure time interval ($t_{mp}$), which is one of said time intervals and corresponds to a remaining time until a minimum pressure needed for injection can be achieved.

6. The method according to claim 1, wherein one said standby condition depends on a comparison of a maximum-injection-gear-shift time interval ($t_{mi,gs}$), which is one of said time intervals and corresponds to a remaining time until a maximum injection rate is potentially needed in case of a gear shift, and the sum of the minimum-pressure time interval ($t_{mp}$), and a maximum-flow time interval ($t_{mf}$), which is one of said time intervals and corresponds to a remaining time until maximum flow can be supplied to the injector starting from zero flow.

7. The method according to claim 1, comprising changing a pump speed ($n_p$) depending on at least one of the at least one standby condition.

8. The method according to claim 1, wherein a pump speed ($n_p$) is decreased by deactivating the pump if the pump speed ($n_p$) is below a predefined minimum speed ($n_{min}$).

9. The method according to claim 1, wherein at least one of said time intervals is determined as a function of an engine speed ($n_e$) and an engine load ($M_e$).

10. The method according to claim 1, wherein at least one of said time intervals is determined as a function of a gear number ($N_g$).

11. The method according to claim 1, wherein the minimum-pressure time interval ($t_{mp}$) is determined as a function of a pump speed ($n_p$) and a current feed pressure ($p_f$).

12. The method according to claim 1, wherein at least one of said time intervals is determined from a lookup table.

13. A water injection system for an internal combustion engine, comprising an injector for injecting water at least indirectly into the combustion engine, a pump for pumping water from a tank through a feed line to the injector, and a control unit configured to:
   determine if there is a current demand for water injection;
   if there is no current demand, check at least one pre-defined standby condition to determine if, starting from a current pump performance, it is possible to meet a potential future demand for water injection; and
   increase the pump performance if at least one of the at least one standby condition is fulfilled,
   wherein at least one of the at least one standby condition depends on a comparison of at least two time intervals, and wherein one said standby condition depends on a comparison of a first-injection time interval ($t_{fi}$), which is one of said time intervals and corresponds to a remaining time until a first water injection is potentially needed, and a minimum-pressure time interval ($t_{mp}$), which is one of said time intervals and corresponds to a remaining time until a minimum pressure needed for injection can be achieved.

\* \* \* \* \*